United States Patent
Yun et al.

(10) Patent No.: US 10,476,159 B2
(45) Date of Patent: Nov. 12, 2019

(54) COAXIAL RESONANCE COIL HAVING TOROIDAL SHAPE FOR WIRELESS POWER TRANSMISSION

(71) Applicant: Electronics and Telecommunications Research Institute, Daejeon-si (KR)

(72) Inventors: Je Hoon Yun, Daejeon-si (KR); Seong Min Kim, Daejeon-si (KR); Jung Ick Moon, Daejeon-si (KR); Duk Ju Ahn, Daejeon-si (KR); Soon Ik Jeon, Daejeon-si (KR); In Kui Cho, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 254 days.

(21) Appl. No.: 15/365,515

(22) Filed: Nov. 30, 2016

(65) Prior Publication Data
US 2017/0155195 A1 Jun. 1, 2017

(30) Foreign Application Priority Data

Nov. 30, 2015 (KR) .................. 10-2015-0169397
Oct. 31, 2016 (KR) .................. 10-2016-0143569

(51) Int. Cl.
*H01F 38/14* (2006.01)
*H02J 17/00* (2006.01)
*H01Q 7/00* (2006.01)
*H04B 5/00* (2006.01)

(52) U.S. Cl.
CPC ............. *H01Q 7/00* (2013.01); *H04B 5/0037* (2013.01); *H04B 5/0081* (2013.01)

(58) Field of Classification Search
CPC ....... H01Q 7/00; H04B 5/0037; H04B 5/0081
See application file for complete search history.

(56) References Cited

U.S. PATENT DOCUMENTS

| | | | |
|---|---|---|---|
| 5,845,220 A * | 12/1998 | Puthoff | H01Q 7/00 455/899 |
| 5,952,978 A | 9/1999 | VanVoorhies | |
| 2003/0146803 A1 * | 8/2003 | Pickard | H03H 7/38 333/32 |

(Continued)

FOREIGN PATENT DOCUMENTS

| KR | 10-1174400 B1 | 8/2012 |
|---|---|---|
| KR | 10-2013-0112233 A | 10/2013 |

OTHER PUBLICATIONS

Hee-Jin Lee et al., "Electromagnetically Coupled Resonators Using Toroidal Ferrite Core for Wireless Power Transfer", IMWSIWPT2012 Proceedings, 2012, pp. 183-186.

(Continued)

*Primary Examiner* — Jared Fureman
*Assistant Examiner* — Esayas G Yeshaw
(74) *Attorney, Agent, or Firm* — William Park & Associates Ltd.

(57) ABSTRACT

A coaxial resonance coil having a toroidal shape for wireless power transmission is provided. The coaxial resonance coil may include a central conductive wire used as a power feeding loop for indirectly feeding power to a resonance coil, and an outer conductive wire used as a resonance coil which is wound a plurality of turns in a toroidal shape around the central conductive wire as an axis.

7 Claims, 19 Drawing Sheets

(56) References Cited

U.S. PATENT DOCUMENTS

| | | | |
|---|---|---|---|
| 2007/0259644 A1* | 11/2007 | Chan | H04B 3/54 |
| | | | 455/402 |
| 2011/0175455 A1* | 7/2011 | Hashiguchi | H02J 5/005 |
| | | | 307/104 |
| 2012/0161906 A1* | 6/2012 | Kitano | H01P 1/2053 |
| | | | 333/222 |
| 2013/0009650 A1* | 1/2013 | Sakakibara | B60L 3/00 |
| | | | 324/546 |
| 2013/0181541 A1 | 7/2013 | Karalis et al. | |
| 2015/0028687 A1* | 1/2015 | Ichikawa | H01F 38/14 |
| | | | 307/104 |
| 2016/0009650 A1* | 1/2016 | Renga | C07D 213/84 |
| | | | 546/288 |
| 2017/0045593 A1* | 2/2017 | Muller | H01P 3/06 |
| 2017/0149109 A1* | 5/2017 | Hirata | H01P 1/202 |

OTHER PUBLICATIONS

J.P.K. Sampath et al., "Coil Enhancements for High EfficiencyWireless Power Transfer Applications", Industrial Electronics Society, IECON 2014—40th Annual Conference of the IEEE, 2014, pp. 2978-2983.

* cited by examiner

COAXIAL RESONANCE COIL HAVING TOROIDAL SHAPE FOR WIRELESS POWER TRANSMISSION

CROSS-REFERENCE TO RELATED APPLICATION(S)

This application claims priority from Korean Patent Application Nos. 10-2015-0169397, filed on Nov. 30, 2015, 10-2016-0143569, filed on Oct. 31, 2016, in the Korean Intellectual Property Office, the disclosure of which is incorporated herein by reference in its entirety.

BACKGROUND

1. Field

The following description relates to wireless power transmission, and more particularly, to a wireless power transmission and reception resonator.

2. Description of Related Art

In the wireless power transmission technology field, a wireless power transmission and reception resonator is largely classified into an indirect power feeding resonator and a direct power feeding resonator. Here, the direct power feeding resonator has a structure for directly feeding power to a resonance coil, and the indirect power feeding resonator is implemented by separately installing a looped conductive wire for feeding power other than the resonance coil.

The direct power feeding resonator is thinly manufactured compared with the indirect power feeding resonator, but has a limitation in a transmission distance.

On the other hand, a resonance coil of the indirect power feeding resonator, which transmits power using magnetic field resonance, has a helical structure or a spiral structure, and the structure has a limitation in having high inductance since it has an inductance component formed by a magnetic field which is vertical to a horizontal surface. Further, since the looped conductive wire for feeding the power and the resonance coil are manufactured to be separated from each other, the structure is difficult to manufacture and requires a longer manufacturing time. Moreover, the indirect power feeding resonator has a limitation in a degree of freedom of an installation space.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a coaxial resonance coil having a multiple overlap toroidal shape for wireless power transmission and providing a structure in which a power feeding loop is able to be manufactured together by one process without separately manufacturing the power feeding loop as an indirect power feeding structure having a large transmission distance.

Further, the following description relates to a coaxial resonance coil having a multiple overlap toroidal shape for wireless power transmission in which impedance matching is maintained even at a long distance by providing high reactance.

Moreover, the following description relates to a coaxial resonance coil having a multiple overlap toroidal shape for wireless power transmission and having a degree of freedom of an installation space and capable of shortening manufacturing time.

In one general aspect, a coaxial resonance coil having a toroidal shape for wireless power transmission, includes: a central conductive wire used as a power feeding loop of indirectly feeding power to a resonance coil; and an outer conductive wire used as a resonance coil which is wound a plurality of turns in a toroidal shape around the central conductive wire as an axis.

Other features and aspects will be apparent from the following detailed description, the drawings, and the claims.

Figure 1A:
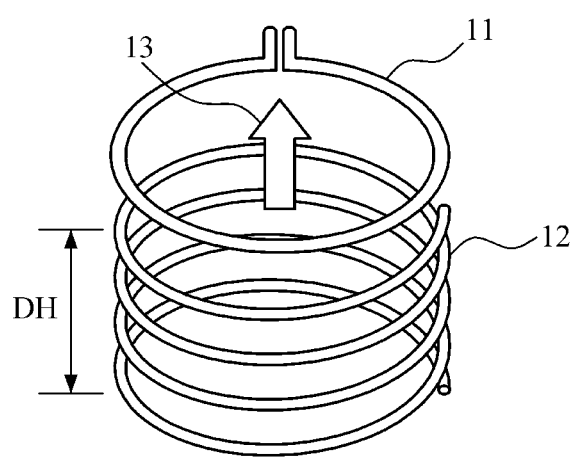
FIGS. 1A and 1B are diagrams illustrating an example of a structure of a general transmission and reception resonator.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present invention will be described in detail with reference to the accompanying drawings. When it is determined that a detailed description regarding a well-known function or configuration unnecessarily obscures the subject matter of the present invention, it will be omitted. Further, the terms used herein are terms defined by considering a function in the present invention, and the meanings may be changed according to intentions or customs of a user, or an operator. Accordingly, definitions of the terms will be determined based on contents described herein.

Figure 1B:
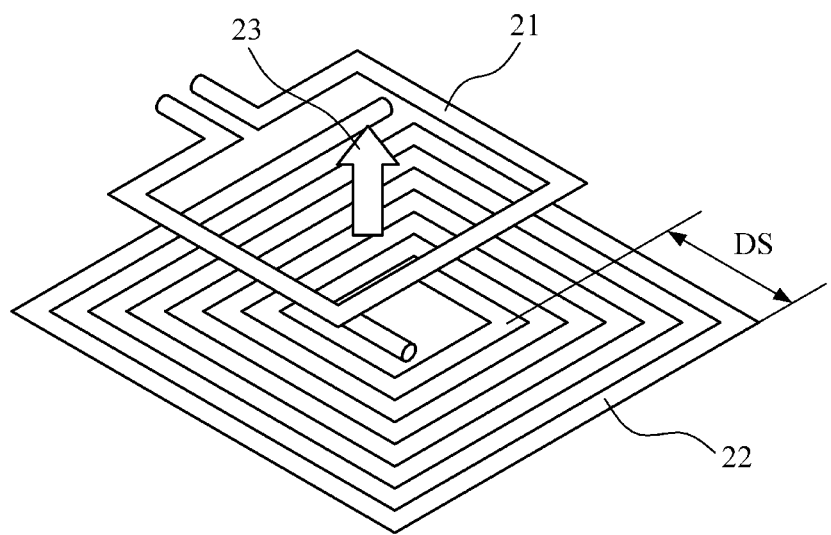

FIGS. 1A and 1B are diagrams illustrating an example of a structure of a general transmission and reception resonator.

An indirect power feeding resonator using a separate looped conductive wire without directly feeding power to a resonance coil is illustrated in FIGS. 1A and 1B. In FIG. 1A, a loop power feeding conductive wire 11 for indirectly feeding power and a resonance coil 12 having a helical shape are illustrated, and in FIG. 1B, a looped power feeding conductive wire 21 for indirectly feeding power and a resonance coil 22 having a spiral shape are illustrated.

It is well known that the structure has an inductance determined by magnetic fields 13 and 23 formed in a vertical direction to a center surface of the helical resonance coil 11 and the spiral resonance coil 21 and the inductance is in proportion to the square of the number of turns by a well-known Wheeler's formula. It is also well known that high inductance increases transmission efficiency and a transmission distance in the resonator. The inductance has a characteristic of being inversely proportional to a thickness DH of the helical resonance coil 11 and a width DS of the spiral resonance coil 22.

Accordingly, the present invention is provided technology of increasing the inductance by proposing a structure for decreasing a thickness and a width of a resonance coil.

Further, a predetermined separate installation space may be needed when directly installing in a product because the power feeding conductive wires 11 and 21 and the resonance coils 12 and 22 are manufactured to be separated to have a constant structure in which their shapes are fixed, and a rate dependent on manual labor may be increased since the power feeding conductive wires 11 and 21 and the resonance coils 12 and 22 are separately manufactured and impedance matching is implemented by space adjustment. That is, it may be difficult to shorten manufacturing time since the resonator is manufactured by a single conductive wire in the conventional art.

Accordingly, the present invention proposes a transmission and reception resonator having a coaxial resonance coil having a multiple overlap toroidal shape and having an indirect power feeding structure in a central conductive wire.

FIGS. 2A to 2D are diagrams illustrating a coaxial resonance coil having a multiple overlap toroidal shape for wireless power transmission according to an embodiment of the present invention.

Referring to FIGS. 2A to 2D, a coaxial resonance coil having a multiple overlap toroidal shape for wireless power transmission (hereinafter, it may be referred to as a "resonator") may include a central conductive wire 110 used as a power feeding loop, and an outer conductive wire 120 used as a resonance coil which is wound in a plurality of turns to have a toroidal shape by using the central conductive wire 110 as an axis.

When having this structure, higher inductance may be generated using a magnetic field 2 formed along the central conductive wire 110 in addition to a magnetic field 1 which is in a vertical direction to the center plane.

Figure 2A:
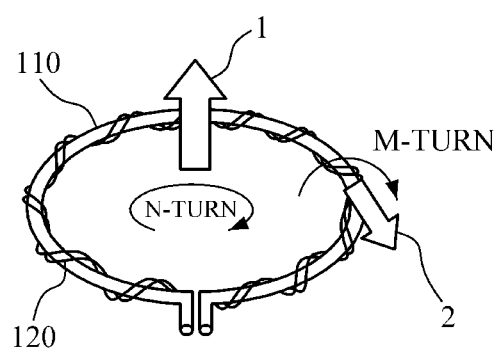
FIGS. 2A to 2D are diagrams illustrating a coaxial resonance coil having a multiple overlap toroidal shape for wireless power transmission according to an embodiment of the present invention.
Figure 2B:
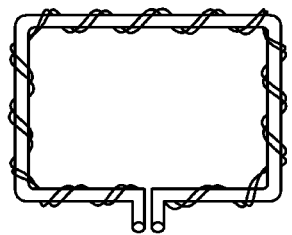
Figure 2C:
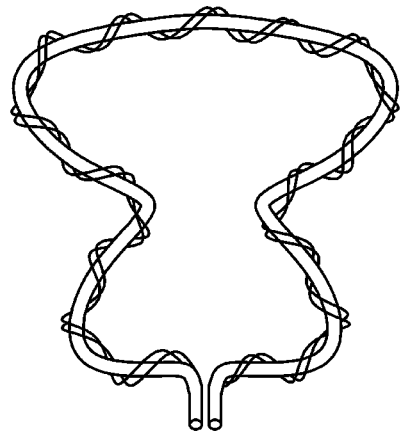
Figure 2D:
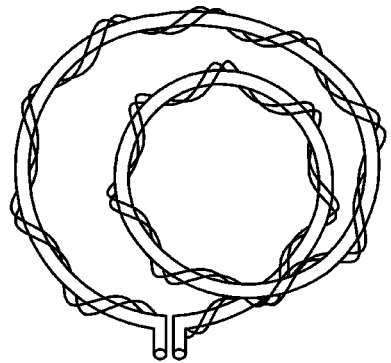

Further, a shape of the resonator of the present invention may be diversely implemented. That is, a resonator having a circular loop shape as shown in FIG. 2A, a resonator having a rectangular loop shape as shown in FIG. 2B, a resonator having an arbitrary shape for the indirect power feeding as shown in FIG. 2C, and a resonator having a solenoid shape for the indirect power feeding as shown in FIG. 2D may be implemented. Since a degree of freedom for an installation space in a product is increased, a limitation factor for installation may be improved.

Further, referring to FIG. 2A, for an open coaxial resonance coil having a circular loop shape having one turn (N=1) and a twofold 14-turn (M=14) toroidal shape, the open coaxial resonance coil may have a structure in which the magnetic field 1, which is proportional to the square of N, is generated, and the magnetic field 2 is generated in proportion to the square of the number of M-turns wound around a resonance cable in a direction of the central conductive wire, and thus inductance is increased. Further, a structure in which a standardization of a thickness is possible due to the power being fed through the central conductive wire is proposed. Since the structure is manufactured by integrating the power feeding conductive wire 110 and the outer conductive wire 120, the open coaxial resonance coil may be manufactured to have an arbitrary structure suitable for an installation space inside the product.

Figure 3:
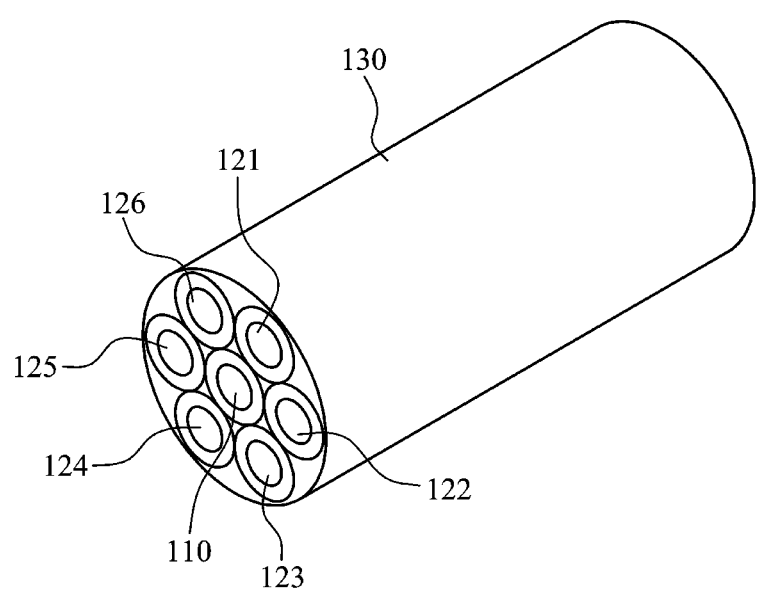
FIG. 3 is a diagram illustrating a multiple overlap coaxial cable bundled by an outer cover according to an embodiment of the present invention.

FIG. 3 is a diagram illustrating a multiple overlap coaxial cable bundled by an outer cover according to an embodiment of the present invention.

Referring to FIG. 3, a multiple overlap coaxial cable may be manufactured by bundling the central conductive wire 110 and the outer conductive wire 120 inside an outer cover 130 consisting of a non-conductive material having a small loss. The cable may have a structure that is mass-producible. That is, a rate of dependency on manual labor may be decreased, and thus a mass production efficiency may be increased.

That is, the central conductive wire 110 may be located in the center, and the outer conductive wire which includes six resonance coils 121, 122, 123, 124, 125, and 126 may be arranged in one layer outside the central conductive wire 110.

Figure 4A:
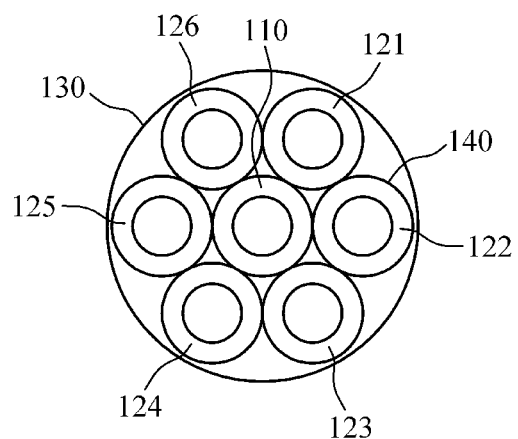
FIGS. 4A and 4B are cross-sectional views of a multiple overlap coaxial cable.
Figure 4B:
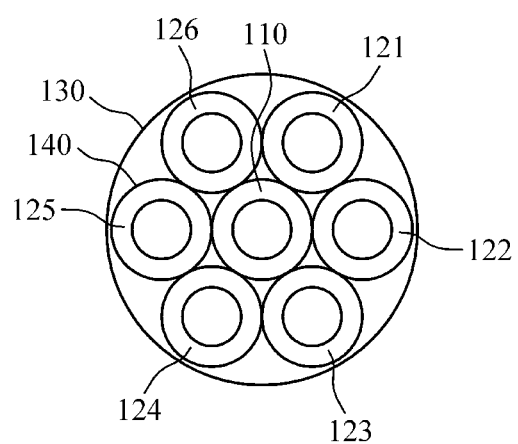

FIGS. 4A and 4B are cross-sectional views of a multiple overlap coaxial cable, FIG. 4A is a cross-sectional view of a left side end, and FIG. 4B is a cross-sectional view of a right side end.

Referring to FIGS. 4A and 4B, a multiple overlap coaxial cable may be manufactured so that contact between conductors is not generated by installing the outer cover 130 and an outer cover 140 which are consisting of a non-conductive material, the outer cover 140 surrounding each of the central conductive wire 110 and the six resonance coils 121, 122, 123, 124, 125, and 126. The central conductive wire 110 which is located in the center of the cable may be used for indirect power feeding, and the conductive wires 121, 122, 123, 124, 125, and 126 which are located outside the central conductive wire 110 may be used as a resonance coil.

According to an embodiment, the resonance coils 121, 122, 123, 124, 125, and 126 which are located outside the central conductive wire 110 may be bundled as one conductive wire like FIG. 3, and have an open type structure.

Figure 5:
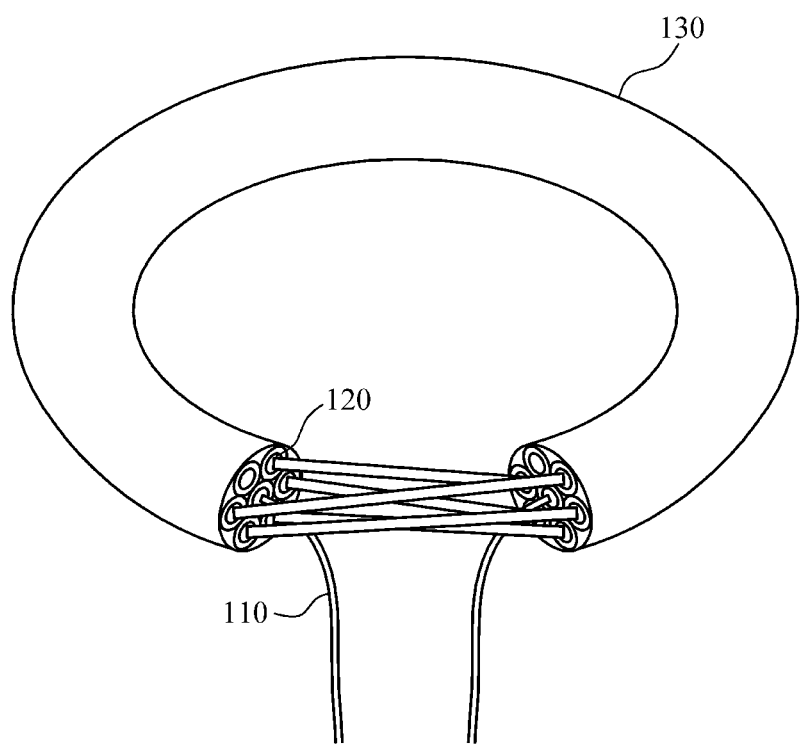
FIG. 5 is a diagram illustrating an example of an open coaxial resonance coil which has a circular loop shape and a sixfold one-sixth-turn toroidal shape implemented to have indirect power feeding in a central conductive wire using a multiple overlap coaxial cable bundled by one outer cover according to the present invention.

Accordingly, when the resonance coil (121 of left) shown in FIG. 4A is connected to the resonance coil (122 of right) shown in FIG. 4B, the resonance coil (122 of left) shown in FIG. 4A is connected to the resonance coil (123 of right) shown in FIG. 4B, the resonance coil (123 of left) shown in FIG. 4A is connected to the resonance coil (124 of right) shown in FIG. 4B, the resonance coil (124 of left) is connected to the resonance coil (125 of right) shown in FIG. 4B, and the resonance coil (125 of left) shown in FIG. 4A is connected to the resonance coil (126 of right) shown in FIG. 4B, a coaxial resonance coil which is slightly twisted and has a sixfold one-sixth-turn toroidal shape as shown in FIG. 5 may be manufactured.

FIG. 5 is a diagram illustrating an example of an open coaxial resonance coil which has a circular loop shape and a sixfold one-sixth-turn toroidal shape implemented to have an indirect power feeding structure in a central conductive wire using a multiple overlap coaxial cable bundled by one outer cover according to the present invention.

Referring to FIG. 5, an indirect power feeding structure of feeding power to the central conductive wire 110 which is located in the center is illustrated. A sequence of connecting the outer conductive wire 120 may be diversely changed based on an assumption that every resonance coil becomes one conductive wire in addition to the examples described with reference to FIGS. 4A and 4B.

Figure 6:
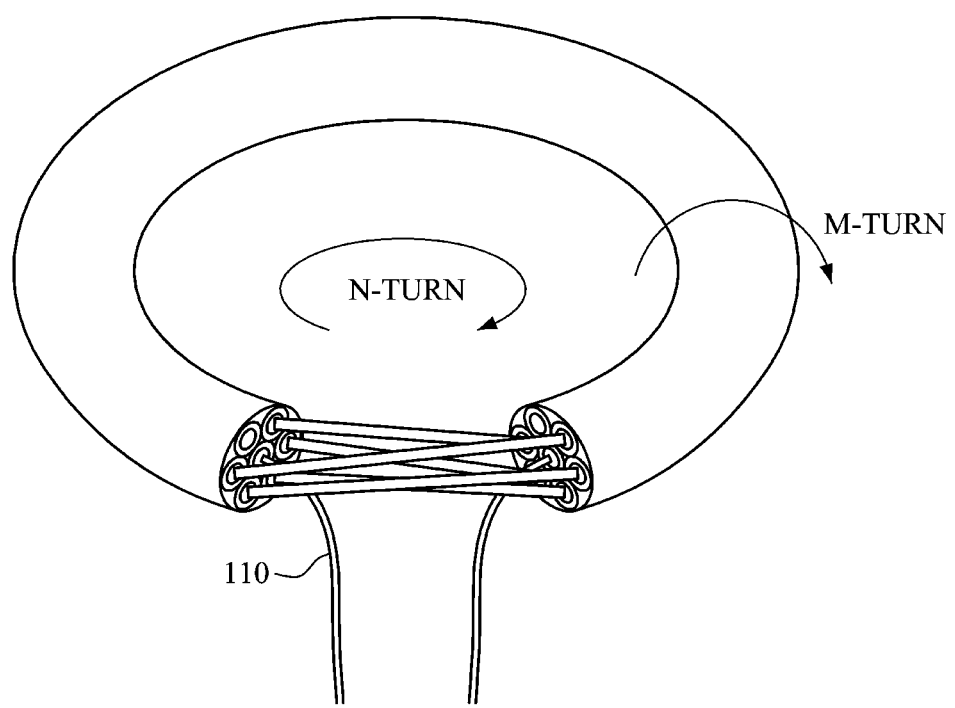
FIG. 6 is a diagram illustrating an example of an open coaxial resonance coil which has a circular loop shape (N=1) and a sixfold M-turn toroidal shape implemented to have indirect power feeding in a central conductive wire using a multiple overlap coaxial cable bundled by one outer cover according to the present invention.

FIG. 6 is a diagram illustrating an example of an open coaxial resonance coil which has a circular loop shape (N=1) and a sixfold M-turn toroidal shape implemented to have indirect power feeding in a central conductive wire using a multiple overlap coaxial cable bundled by one outer cover according to the present invention.

Referring to FIG. 6, N may be set to have an arbitrary value. As an example, the coil may have the solenoid shape which is N=2 as shown in FIG. 2D, and M may be set to have an arbitrary value.

That is, a coaxial resonance coil having an N-turn solenoid shape and an M-turn toroidal shape may be manufactured using these structural characteristic. Since the coaxial resonance coil having the 2-turn solenoid shape and the 21-turn toroidal shape shown in FIG. 2D greatly secures a magnetic field which is vertical to the center plane, the coaxial resonance coil having the 2-turn solenoid shape and the 21-turn toroidal shape shown in FIG. 2D may secure an inductance higher than the coaxial resonance coil having the circular loop shape shown in FIG. 2A.

Figure 7:
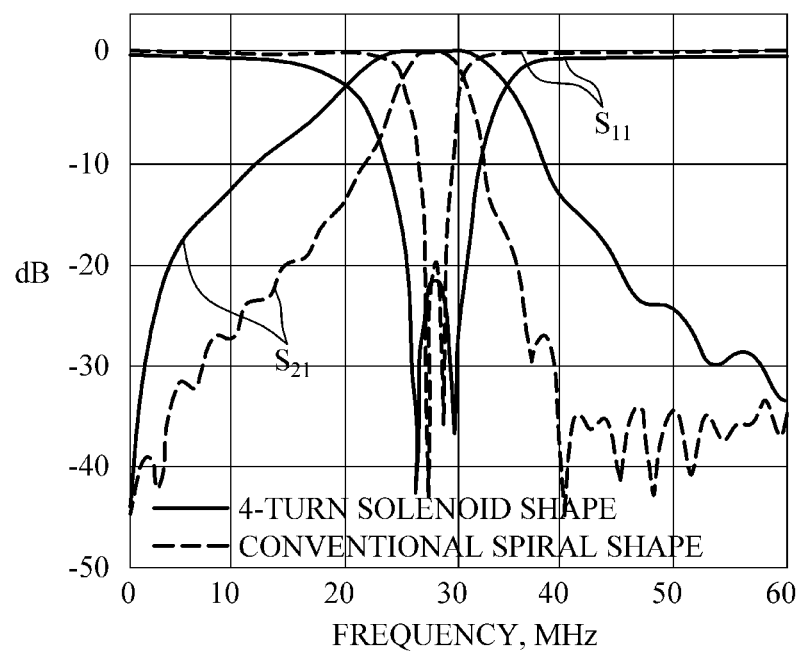
FIG. 7 is a graph for comparing bandwidths of a coaxial resonance coil for transmission and reception which has a rectangular loop shape and a fourfold one-fourth-turn toroidal shape implemented to have indirect power feeding in a central conductive wire according to the present invention and a resonance coil having a conventional spiral structure.

FIG. 7 is a graph for comparing bandwidths of a coaxial resonance coil for transmission and reception which has a rectangular loop shape and a fourfold one-fourth-turn toroidal shape implemented to have indirect power feeding in a central conductive wire according to the present invention and a resonance coil having a conventional spiral shape. Here, a value compared when outer radii are the same and transmission and reception distances are the same is shown.

Referring to FIG. 7, it may be known that a wider band characteristic is obtained in the present invention compared with the conventional art and a resonant frequency split into two is formed in the present invention, and a phenomenon in which the resonant frequency becomes one is generated like a S parameter of the conventional resonator having the spiral shape at a greater transmission distance than the conventional resonator having the spiral shape. Since the phenomenon in which the resonant frequency split into two is formed is a phenomenon generated when the transmission and reception distance is small, it may be shown that the resonator having the structure proposed in the present invention is capable of performing long distance transmission.

Figure 8:
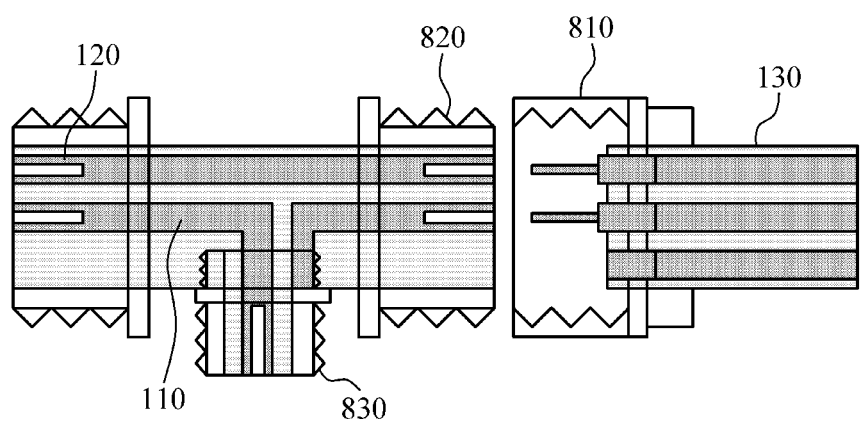
FIG. 8 is a sectional view illustrating an example of a prefabricated connection device for implementing an open coaxial resonance coil having a multiple overlap toroidal shape and having an indirect power feeding structure in a central conductive wire using a multiple overlap coaxial cable according to the present invention.

FIG. 8 is a sectional view illustrating an example of a prefabricated connection device for implementing an open coaxial resonance coil having a multiple overlap toroidal shape type and having an indirect power feeding structure in a central conductive wire using a multiple overlap coaxial cable according to the present invention.

Referring to FIG. 8, a prefabricated connection device may include a connection device 810 which is directly connected to a multiple overlap coaxial cable, a central connection device 820 for connecting the connection device, and a connection device 830 to which a power feeding cable is connected. Through this example, it is possible to have an advantage of facilitating connection using two types of prefabricated connection devices. A process of installing in and manufacturing a product may be decreased due to this structural characteristic. A connection device having various structures may be used.

Meanwhile, since power transmission is performed by being dependent on the magnetic field in the closed resonance coil unlike the open resonance coil, a length of the resonance coil should be longer when the frequency is decreased. However, when the length of the resonance coil is longer, a resistance component may be increased, and thus transmission efficiency is decreased. In order to solve the problem, according to an embodiment of the present invention, the problem may be solved by installing a capacitor having a small loss.

Figure 9:
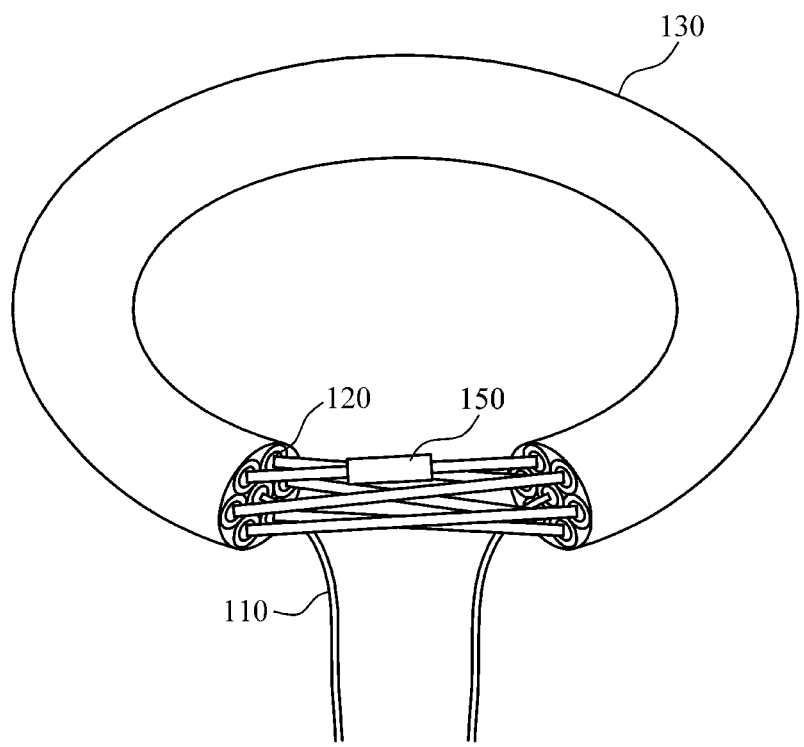
FIG. 9 is a diagram illustrating an example of a closed coaxial resonance coil which has a circular loop shape and has a sixfold one-sixth-turn toroid shape implemented to have indirect power feeding in a central conductive wire using a multiple overlap coaxial cable bundled by one outer cover according to the present invention.

FIG. 9 is a diagram illustrating an example of a closed coaxial resonance coil which has a circular loop shape and a sixfold one-sixth-turn toroidal shape implemented to have indirect power feeding in a central conductive wire using a multiple overlap coaxial cable bundled by one outer cover according to the present invention.

Referring to FIG. 9, a capacitor 150 having a small loss may be installed at the outer conductive wire 120.

Figure 10:
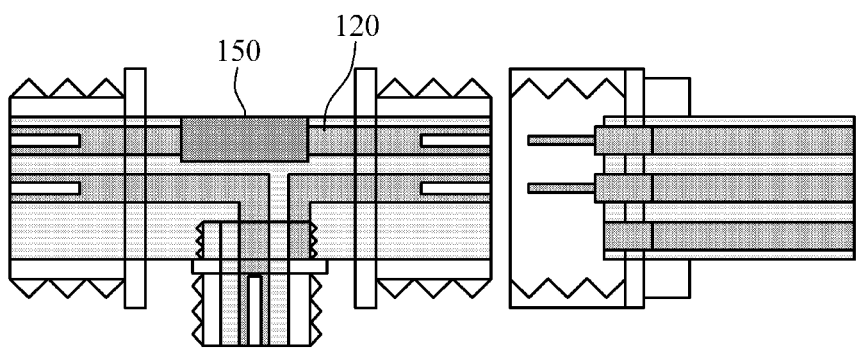
FIG. 10 is a sectional view illustrating an example of a capacitor-integrated prefabricated connection device for implementing a closed coaxial resonance coil having a multiple overlap toroidal shape and having an indirect power feeding structure in a central conductive wire using a multiple overlap coaxial cable according to the present invention.

FIG. 10 is a sectional view illustrating an example of a capacitor-integrated prefabricated connection device for implementing a closed coaxial resonance coil having a multiple overlap toroidal shape and having an indirect power feeding structure in a central conductive wire using a multiple overlap coaxial cable according to the present invention.

Referring to FIG. 10, a structure of a prefabricated connection device in which the capacitor 150 shown in FIG. 9 is able to be easily connected is illustrated. Here, the capacitor 150 may be implemented as a fixed type or a variable type. When the capacitor 150 is manufactured as the variable type, an impedance matching structure for a specific frequency may be easily implemented since it is possible to arbitrarily change the resonant frequency.

Figure 11:
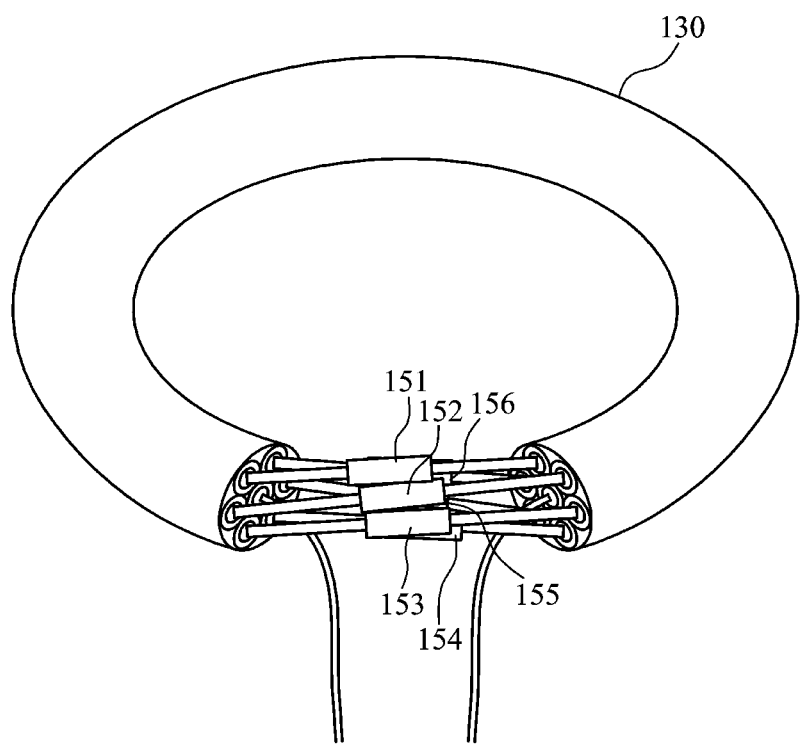
FIG. 11 is a diagram illustrating an example of a closed coaxial resonance coil which consists of six transponders having a circular loop shape and has a toroidal shape implemented to have indirect power feeding in a central conductive wire using a multiple overlap coaxial cable bundled by one outer cover according to the present invention.

FIG. 11 is a diagram illustrating an example of a closed coaxial resonance coil which consists of six transponders having a circular loop shape and has a toroidal shape implemented to have indirect power feeding in a central conductive wire using a multiple overlap coaxial cable bundled by one outer cover according to the present invention.

Referring to FIG. 11, an example in which capacitors 151, 152, 153, 154, 155, and 156 are installed at six transponders having the circular loop shape, respectively, is illustrated. A capacitance value of the capacitor may be set to be matched for long distance transmission, or an input impedance value may be set to be constant in a transmission interval. Here, the conductive wire (121 of left) shown in FIG. 4a and FIG. 4b is connected to the conductive wire (121 of right), the conductive wire (122 of left) is connected to the conductive wire (122 of right), the conductive wire (123 of left) is connected to the conductive wire (123 of right), the conductive wire (124 of left) is connected to the conductive wire (124 of right), the conductive wire (125 of left) is connected to the conductive wire (125 of right), and the conductive wire (126 of left) is connected to the conductive wire (126 of right), and the capacitors may be installed therebetween.

Figure 12:
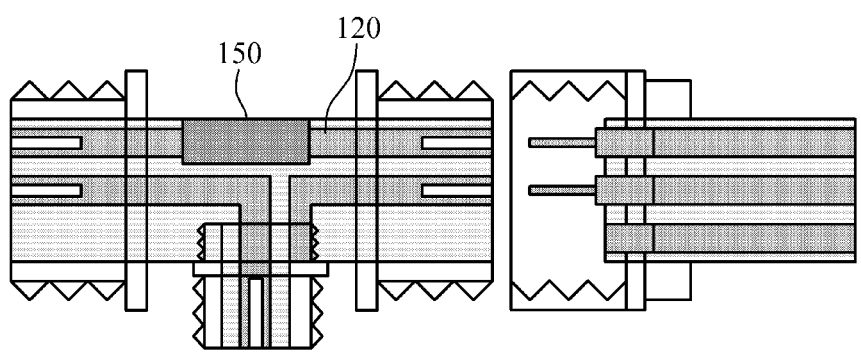
FIG. 12 is a sectional view illustrating an example of a multiple capacitor-integrated prefabricated connection device for implementing a closed coaxial resonance coil having a multiple overlap toroidal shape and having an indirect power feeding structure in a central conductive wire using a multiple overlap coaxial cable according to the present invention.

FIG. 12 is a frontal and cross-sectional view illustrating an example of a capacitor-integrated prefabricated connection device for implementing a closed coaxial resonance coil having a multiple overlap toroidal shape and having an indirect power feeding structure in a central conductive wire using a multiple overlap coaxial cable according to the present invention. The capacitors 151 and 153 may be manufactured as the fixed type or the variable type as described above.

Figure 13A:
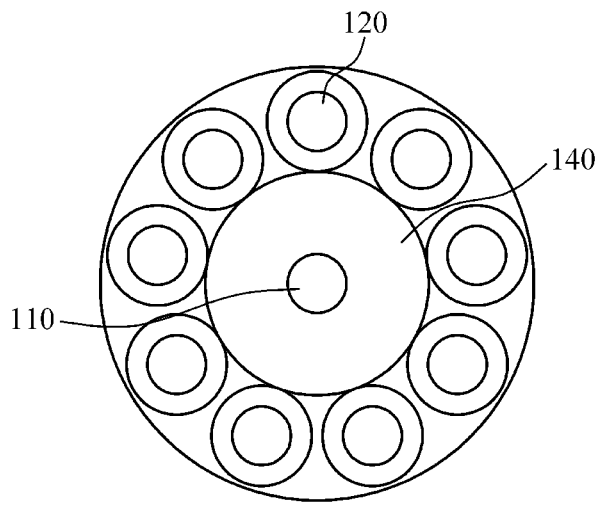
FIGS. 13A and 13B are diagrams illustrating other examples of a multiple overlap coaxial cable.
Figure 13B:
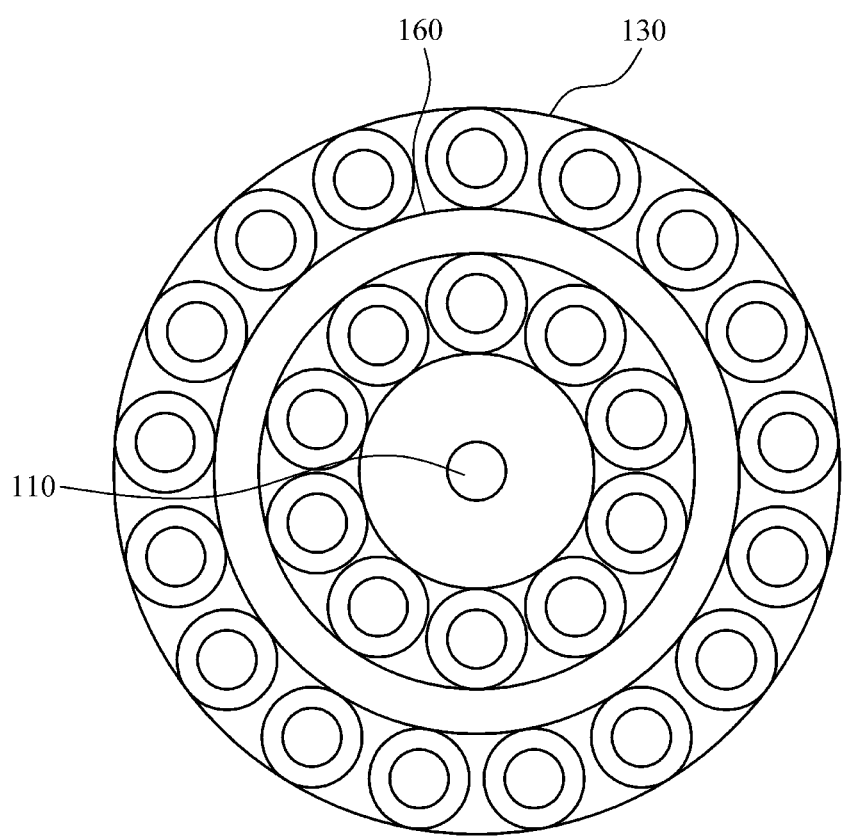

FIGS. 13A and 13B are diagrams illustrating other examples of a multiple overlap coaxial cable.

Referring to FIG. 13A, a multiple overlap coaxial cable having a large distance between the central conductive wire 110 and the outer conductive wire 120 by enlarging the outer cover 140 of the central conductive wire 110 is illustrated.

Referring to FIG. 13B, a multiple overlap coaxial cable having a double outer conductive wire using the outer covers 130 and 160 consisting of a non-conductive material is illustrated.

The former may have an advantageous structural characteristic when requiring long distance transmission by increasing a distance between the resonance coil and the power feeding loop, and the latter may have a structural characteristic in which power transmission on a much smaller frequency band is possible by increasing the length of the resonance coil when being manufactured to have the circular loop shape, the rectangular loop shape, or the like, or the solenoid shape in which the number of turns is limited.

According to embodiments of the present invention, a resonator having high inductance can be provided, and a structure in which impedance matching is stabilized even at a transmission distance greater than the conventional art can be proposed. Since the resonance coil and the power feeding loop are able to be manufactured as one multiple overlap coaxial cable unlike the conventional art having a separate power feeding loop, a resonator having an arbitrary shape can be manufactured, and also be manufactured in a prefabricated type.

Accordingly, the resonator of the present invention may have a structural advantage in which the resonator is easily implemented and installed compared with the conventional resonator having the spiral shape or helical shape. The power feeding loop and the resonance coil are able to be manufactured as the multiple overlap coaxial cable, the resonator having an arbitrary shape such as the circular loop shape, the rectangular loop shape, the N-turn spiral shape can be manufactured, and a degree of freedom of the installation space can be increased, and thus the wireless power transmission technology for various products can be easily implemented.

While the present invention is described with reference to the above-described embodiments, it should be apparent to those skilled in the art that various modifications can be made to the above-described embodiments of the present invention without departing from the spirit or scope of the invention. Therefore, the above-described embodiments should be considered in an illustrative sense rather than a restrictive sense. Accordingly, the scope of the present invention is not limited to the above-described embodiments, and includes various embodiments included in the scope of the appended claims and their equivalents.

What is claimed is:

1. A coaxial resonance coil having a toroidal shape, comprising:
   a central conductive wire used as a power feeding loop which indirectly feeds power to a resonance coil; and
   an outer conductive wire used as a plurality of resonance coils which is wound a plurality of turns in a toroidal shape around the central conductive wire as an axis,
   wherein the outer conductive wire is at least one resonance coil which is manufactured as an open type.

2. The coaxial resonance coil of claim 1, wherein the central conductive wire is formed to have a circular shape, a rectangular shape, or a solenoid shape.

3. The coaxial resonance coil of claim 1, wherein an outer cover having a non-conductive material is formed on each of the central conductive wire and the outer conductive wire.

4. The coaxial resonance coil of claim 1, wherein the central conductive wire and the outer conductive wire are configured to be arranged inside one outer cover having a non-conductive material in a form of a coaxial resonance cable.

5. The coaxial resonance coil of claim 3, wherein a distance between the central conductive wire and the outer conductive wire is adjusted by adjusting a thickness of the outer cover of the central conductive wire.

6. A coaxial resonance coil having a toroidal shape, comprising:
   a central conductive wire used as a power feeding loop which indirectly feeds power to a resonance coil; and
   an outer conductive wire used as a plurality of resonance coils which is wound a plurality of turns in a toroidal shape around the central conductive wire as an axis,
   wherein the resonance coil is arranged in a plurality of layers with respect to the central conductive wire as an axis.

7. A coaxial resonance coil having a toroidal shape, comprising:
   a central conductive wire used as a power feeding loop which indirectly feeds power to a resonance coil; and
   an outer conductive wire used as a plurality of resonance coils which is wound a plurality of turns in a toroidal shape around the central conductive wire as an axis,
   wherein the resonance coil is implemented in a prefabricated type using a connection device.

* * * * *